April 25, 1961 W. B. HERBERT 2,981,160
TRAVERSING MECHANISM FOR MACHINE TOOLS
Filed May 28, 1956 4 Sheets-Sheet 1

INVENTOR.
WILLIAM B. HERBERT
BY
Curtis, Morris + Safford
ATTORNEYS

April 25, 1961 W. B. HERBERT 2,981,160
TRAVERSING MECHANISM FOR MACHINE TOOLS
Filed May 28, 1956 4 Sheets-Sheet 2

INVENTOR.
WILLIAM B. HERBERT
BY
Curtis, Morris + Safford
ATTORNEYS

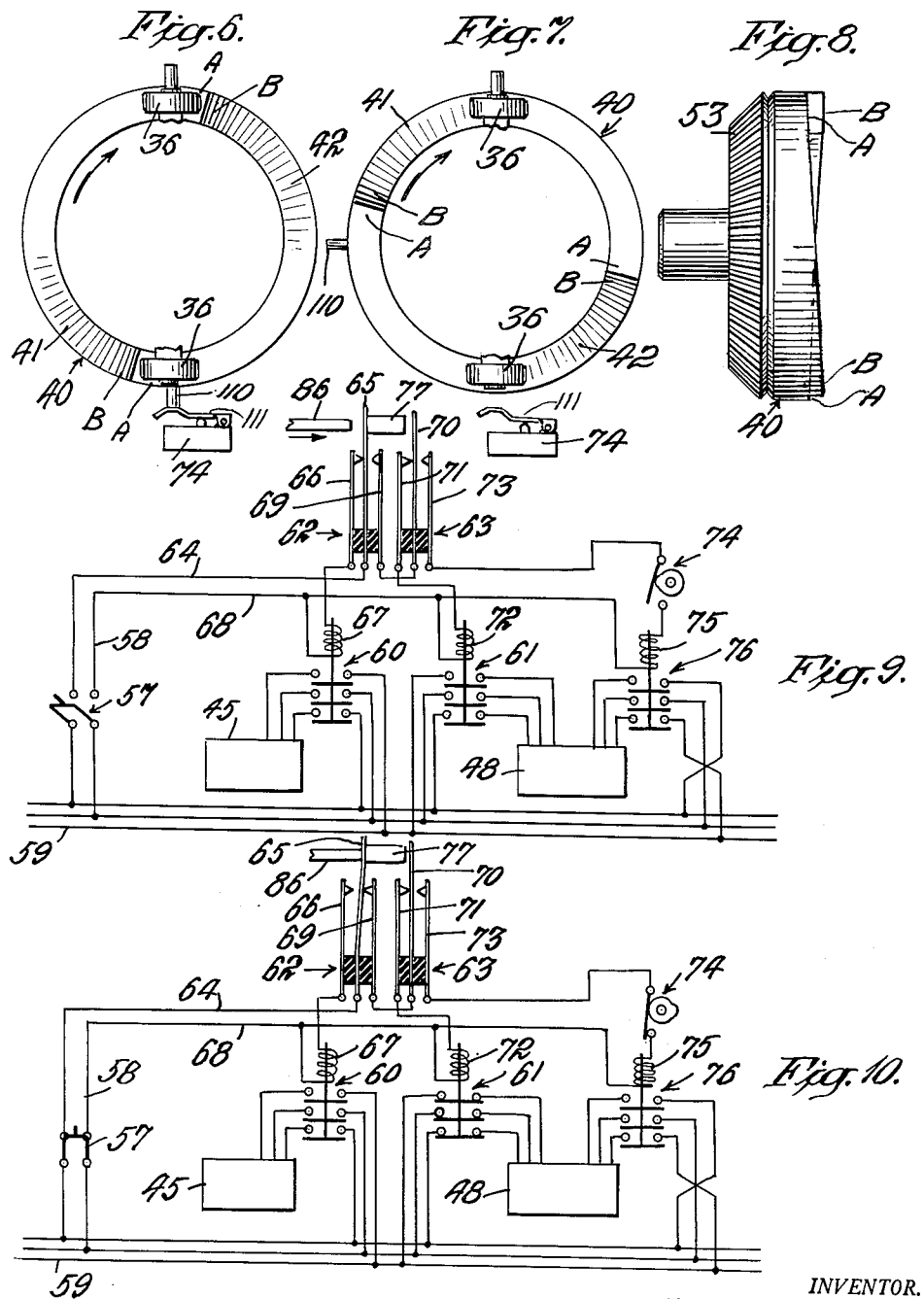

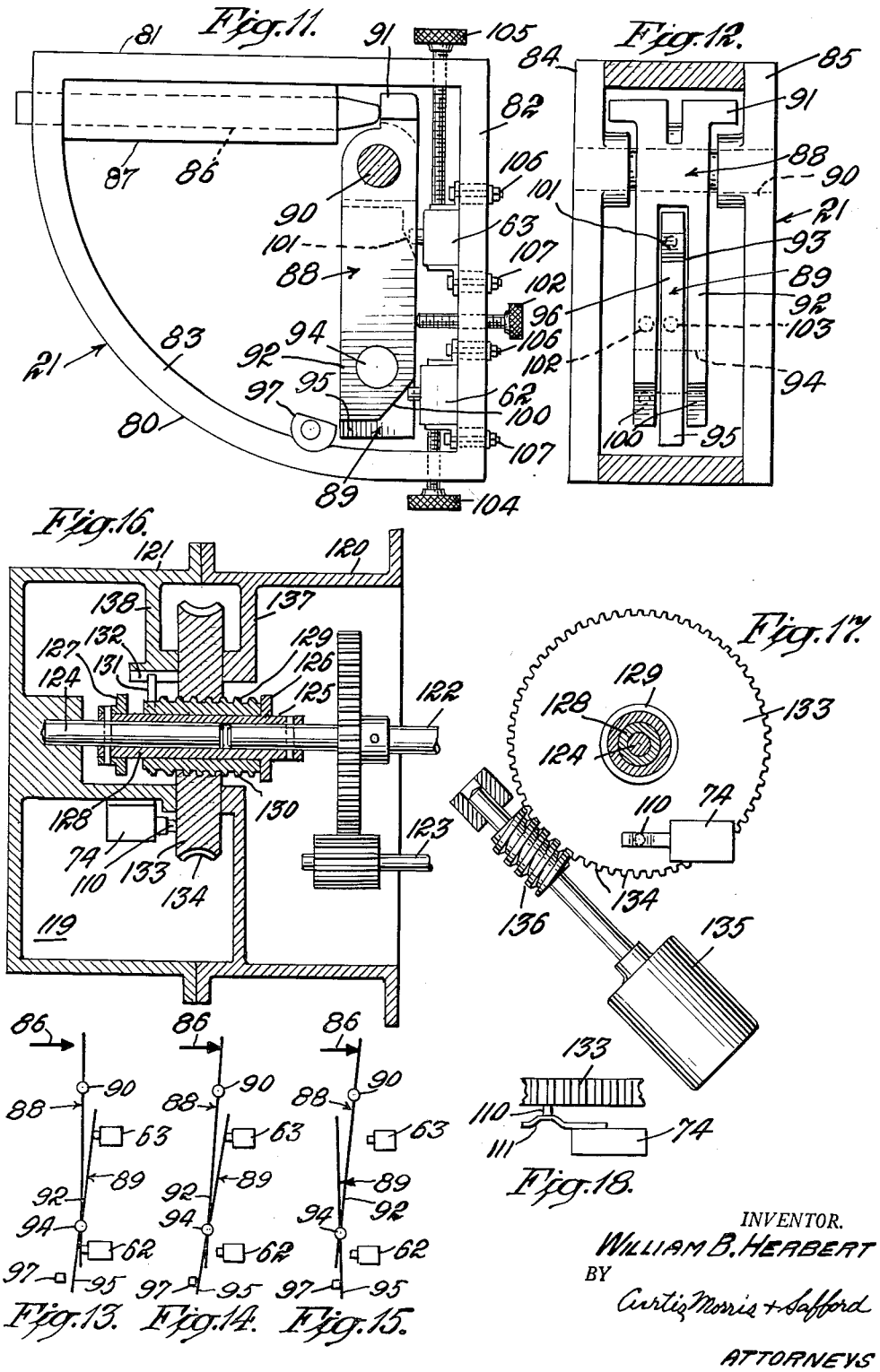

United States Patent Office 2,981,160  
Patented Apr. 25, 1961

2,981,160

TRAVERSING MECHANISM FOR MACHINE TOOLS

William B. Herbert, Yantacaw Brook Road, Montclair, N.J.

Filed May 28, 1956, Ser. No. 587,725

17 Claims. (Cl. 90—22)

The present invention relates to machine tools, and more particularly to an automatic traversing mechanism for relatively moving an element of the machine to accurately position the tool with respect to the workpiece.

The traversing mechanism of the present invention is adapted for use with many types of machine tools such as milling and boring machines having relatively movable work and tool supports. Usually such machines have a movable table for supporting the workpiece and the table is adapted to be reversibly traversed in one path on a slide. The slide also may be reversibly traversed on the frame to bodily move the table and workpiece in a path at right angles to the direction traversed by the table. The tool support is usually mounted for movement vertically with respect to the table and also may be mounted for movement horizontally. Each movable element of the machine is traversed by force-applying means such as a feed screw which is rotated through gearing either manually or by an electric motor drive.

Automatic power driven traversing mechanisms have been used on machine tools for relatively moving the tool and work supporting elements. Such automatic traversing mechanisms are started manually and stopped automatically in response to the movement of the element. Usually the automatic traversing mechanism rotates a feed screw at a fast rate to move the element to an approximate position and then at a slower rate to move the element to its precise position. The feed screw is placed under compression or tension during such a traversing operation and tends to expand after the element has been accurately positioned which may cause the element to creep from its adjusted position. While the actual amount of creep is negligible in absolute values, it is sufficient to destroy close tolerances of from 1 to 5 ten thousandths of an inch required in some present day machining operations.

Creep which is inherent in automatic traversing mechanisms has been recognized and manufacturers have provided structures to compensate for such creep. The compensating structures attempt to split the backlash by slightly reversing the driving mechanism and in some installations the movable element is reversed several times through successively smaller increments of movement to alternately compress and then tension the feed screw before stopping. While these compensating mechanisms operate satisfactorily they are of complicated construction, expensive to manufacture or require considerable space within the parts of the machine which affects the physical proportions of the parts.

One of the objects of the present invention is to provide a traversing mechanism for accurately positioning a workpiece with respect to a tool without subsequent creep of the adjusted element.

Another object is to provide a traversing mechanism of the type indicated which uncouples the movable element from its drive immediately upon the arrival of the element at its adjusted position.

Another object is to provide a traversing mechanism of the type indicated which bodily slides the movable element to its precise position.

Another object is to provide a traversing mechanism of the type indicated which is adapted to be applied to many standard types of machines as an auxiliary unit.

Still another object of the invention is to provide a traversing mechanism of the type indicated which is of simple and compact construction, adapted for economical manufacture and one which is reliable in operation.

These and other objects will become more apparent from the following description and drawings in which like reference characters denote like parts throughout the several veiws. It is to be expressly understood, however, that the drawings are for the purpose of illustration only and not a definition of the limits of the invention, reference being had for this purpose to the appended claims.

In the drawings:

Figure 6 is an end view of the abutment cam in the position illustrated in Figure 2;

Figure 7 is a view similar to Figure 6 showing the cam rotated from the position illustrated in Figure 2 to that illustrated in Figure 3;

Figure 8 is an enlarged side elevational view of the abutment-cam;

Figure 9 is a diagrammatic view of an electric circuit arrangement for controlling the traversing mechanism and showing the switches positioned to energize the motor for driving the feed screw;

Figure 10 is a view similar to Figure 9 showing the switches operated to energize the motor for driving the abutment-cam;

Figure 11 is a side elevational view of a controller for sensing the movement of the element and actuating the control switches;

Figure 12 is an end view of the controller in section and showing the arrangement of the compound levers;

Figure 13 is a schematic view showing the relationship of the levers as illustrated in Figure 11;

Figure 14 is a view similar to Figure 13 showing one lever of the controller moved away from one of the switches;

Figure 15 is a view similar to Figure 13 showing the other lever moved away from its switch by a multiplied motion of the compound levers;

Figure 16 is a sectional view of a traversing mechanism of modified construction;

Figure 17 is an end elevational view of the driving means of the traversing mechanism of Figure 16 for moving the feed screw and element bodily; and Figure 18 is a plan view of the switch and actuating member for closing and opening the circuit for reversing the driving motor.

In general, the invention comprises a traversing mechanism including a force-applying means such as a conventional feed screw having a screw threaded engagement with the element to be moved. One end of the force-applying means or feed screw bears against an abutment so that rotation of the feed screw advances the element relative to the abutment. In its broadest aspect the invention provides a construction and arrangement of elements for moving the abutment away from the force-applying means after the element has been advanced to its adjusted position so that any stress will be dissipated in movement of the force-applying means without involving any movement of the element. In a more limited aspect of the invention, the abutment comprises a cam movable with respect to the feed screw. The feed screw is rotated relative to the abutment to advance the element rapidly to its approximate position. The cam abutment is then moved relative to the feed screw to bodily push the feed screw and element to its precise position. Immediately upon arrival of the movable element at its precise position, the movement of the cam is reversed to disengage the end of the feed screw. The abutment and drive therefor are so mounted as to adapt them to be applied as a unit to standard machines for cooperation with the feed screw thereon.

The force-applying means and abutment cam are driven by separate electric motors and an electric control circuit is provided for automatically starting and stopping the motor for rotating the feed screw to coarse feed the element, automatically starting the motor for moving the cam to fine feed the element to its precise position and thereafter reverse the direction of rotation of the motor to move the cam in the opposite direction. The electric circuit is controlled by switches which, in turn, are controlled by a novel controller for sensing the movement of the element and having compound levers for multiplying the motion of the element.

Figure 1:
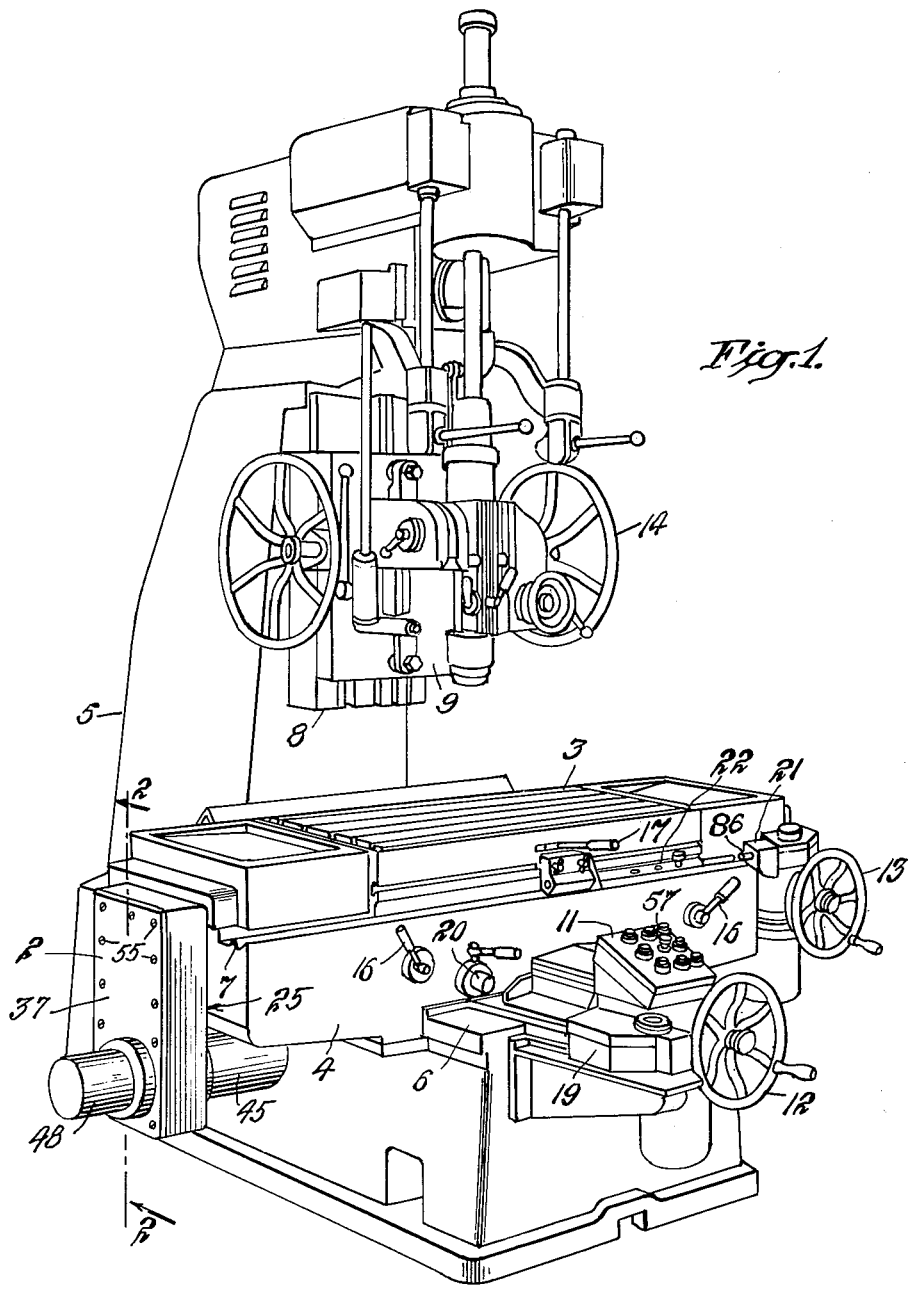
Figure 1 is a perspective view of a jig boring machine to which the traversing mechanism of the present invention is shown applied.

Figure 1 of the drawings shows my improved traversing mechanism 2 applied to a conventional type of jig borer for traversing a work supporting table 3 on a slide 4. The jig boring machine comprises a frame 5 having horizontal ways 6 on which the slide 4 moves and the slide has horizontal ways 7 positioned at right angles to the ways 6 on which the work supporting table 3 is mounted for movement. The upright portion of the frame 5 also has vertical ways 8 on which a tool supporting head 9 is mounted for movement. It is to be understood that the traversing mechanism 2 may be applied to the machine to traverse the slide 4 or the tool holding head 9 relative to the machine frame. In other words, the traversing mechanism is shown applied to the machine to move the table 3, for purposes of illustration, but would be applied to move the slide 4 or head 9 as required in a particular machine.

The machine illustrated in Figure 1 also comprises a push-button control box 11 for starting and stopping the driving means for traversing the slide 4, table 3 and head 9, respectively, and the usual crank wheels 12, 13 and 14 for manually traversing the elements. The slide 4 has clamps 16 for clamping it in adjusted position on the frame 5 and table 3 has a clamp 17 for clamping it in adjusted position on the slide. A cross traverse safety switch and positioning controller 19 is mounted on the frame 5 for engagement by a measuring rod or duplicating bar 20 on the slide and a longitudinal traverse controller 21 is mounted on the slide 4 for engagement by the end of a measuring rod or duplicating bar 22 on the table 3. The positioning controller 21 is of novel construction for controlling my improved traversing mechanism as later explained in detail.

Figure 2:
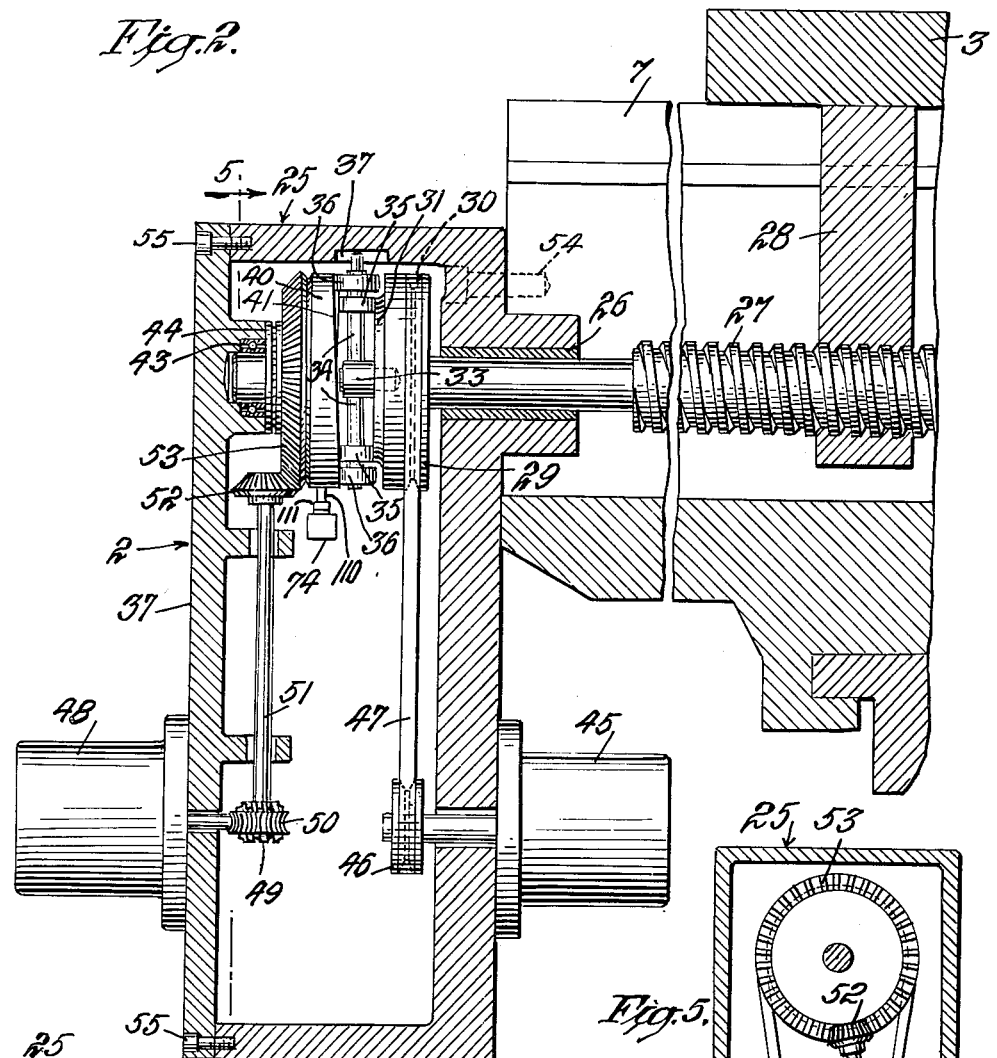
Figure 2 is a vertical sectional view taken on line 2—2 of Figure 1 to show the traversing feed screw engaging a rotatable abutment-cam.
Figure 5:
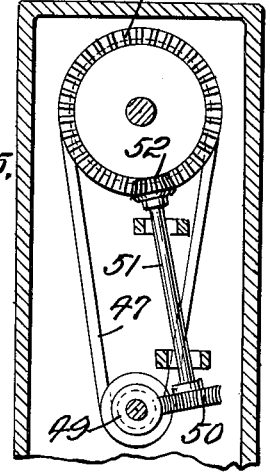
Figure 5 is a sectional view taken on line 5—5 of Figure 2 to show the driving means for rotating the abutment-cam.
Figures 3, 4:
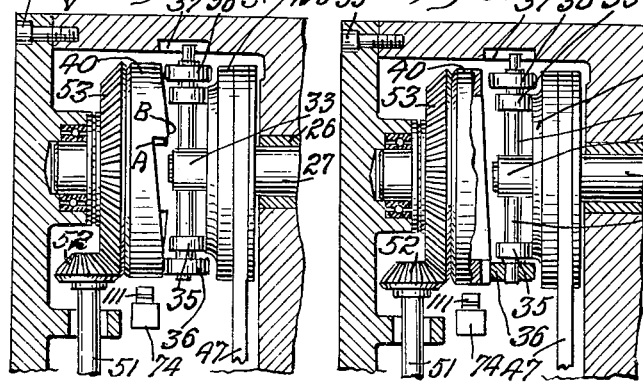
Figure 3 is a view similar to Figure 2 showing the abutment-cam rotated to bodily slide the feed screw and table to an adjusted position.
Figure 4 is a view similar to Figure 3 showing the cam rotated in the opposite direction to disengage the end of the feed screw.

A preferred embodiment of traversing mechanism 2 incorporating the novel features of the present invention is shown most clearly in Figure 2 as comprising a housing 25 mounted on the slide 4 and providing a bearing 26 for one end of a conventional feed screw 27 for moving the table 3 relative to the slide. Feed screw 27 has a screw threaded engagement with a nut 28 depending from the table 3. A sheave 29 is mounted fast on the end of the screw shaft 27 in the housing 25 and has a V-shaped groove 30 in its periphery and a circular raised bearing surface 31 at its outer end. A hub 33 projects axially from the bearing face 31 and mounts a pair of oppositely extending radial arms 34. Each arm 34, in turn, mounts a bearing roller 35 in contact with the bearing surface 31 adjacent its outer periphery and a bearing roller 36 of larger diameter beyond the periphery of the bearing surface. At least one of the radial arms 34 projects into an axial slot 37 in the housing 25 with a close fit to permit axial movement but prevent rotation of the arms and hub 33.

Mounted on a detachable cover plate 37 of the housing 25 is a rotatable abutment 40 coaxial with the feed screw 27. Referring to Figures 2 to 8, this rotatable abutment 40 is in the form of a circular double-ramp cam having a pair of helical face cams 41 and 42 thereon engaged by the rollers 36 on arms 34. Cam faces 41 and 42 have the same pitch with each inclined from a low point A to a high point B at diametrically opposite sides to engage the rollers 36. The abutment-cam 40 is mounted to rotate on the cover plate 37 in antifriction radial and axial thrust bearings 43 and 44. Thus, it will be seen that the end of the feed screw 27 bears against the abutment-cam 40 through the interposed sheave 29 and bearing rollers 35 and 36.

Feed screw 27 is rotated relative to the abutment-cam 40 by an electric motor 45 operating through a pulley 46 and a belt 47 engaging the V-shaped groove 30 in the sheave 29. Abutment-cam 40, in turn, is driven by a motor 48 operating through a worm 49 and wheel 50, shaft 51 and bevelled gears 52 and 53 on the shaft and abutment, respectively. Thus, motor 45 rotates feed screw 27 to advance table 3 relative to the abutment to its approximate position and motor 48 rotates the abutment-cam 40 from the position illustrated in Figure 2 to that illustrated in Figure 3 to bodily push the feed screw 27 and table 3 to its precise position of adjustment.

It will be noted by a reference to Figure 2 that applicant's traversing mechanism 2 is mounted complete on the housing 25 and cover plate 37 thereof for attachment to the machine as a unit. In the illustrated embodiment, the traversing unit 2 is detachably mounted on the slide 4 by means of machine screws 54 and the cover plate 37 carrying the motor 48, abutment-cam 40 and drive therefor is detachably mounted on the housing by means of screws 55. Thus, applicant's traversing mechanism is adapted for attachment to standard machines as an auxiliary device.

Energization of the motors 45 and 48 is controlled by an electric control system illustrated in Figures 9 and 10 in its simplest form. The control circuit utilizies current from a single phase 58 of a 3 phase power line 59 to operate relay switches 60 and 61, respectively, for energizing the motors 45 and 48. The control circuit comprises a line switch 57 adapted to be controlled by one of the push buttons of the control box 11, see Figure 1, and a pair of single pole double throw switches 62 and 63. One conductor 64 of the single phase line 58 is connected to the pole 65 of switch 62. Contact 66 of switch 62 is connected to one side of a coil 67 of relay switch 60 for controlling motor 45 and the opposite end of the coil is connected to the other conductor 68 of the single phase line 58. Contact 69 of switch 62 is connected to the pole 70 of the switch 63. Contact 71 of switch 63 is connected to the coil 72 of the relay switch 61 for controlling the motor 48 and the other side of the coil is connected to a return conductor 68. Contact 73 of switch 63 is connected through a cam operated switch 74 to the coil 75 of a relay switch 76 for reversing the direction of rotation of the motor 48 and the abutment-cam 40.

Pole 65 of switch 62 is positioned for engagement by the end of the measuring rod or duplicating bar 22 movable with the table 3 for shifting the pole from engagement with contact 66 into engagement with contact 69.

Pole 65 of switch 62 has an insulating bar 77 for engagement with the pole 70 of switch 63 to actuate the latter from engagement with contact 71 into engagement with contact 73 upon continued movement of the measuring rod or duplicating bar 22.

The single pole double throw switches 62 and 63 are preferably of the type known as micro-switches in which the movable contacts snap from one to the other of their two positions at a fixed point after a very slight movement. Switches 62 and 63 are mounted on the controller 21 shown in Figure 1 and illustrated in detail in Figures 11 and 12. Controller 21 comprises a frame 80 having right angular top and end walls 81 and 82, an arcuate wall 83 extending therebetween and spaced side walls 84 and 85. A push-rod 86 is slidably mounted in a sleeve 87 depending from the top wall and the end of the push-rod projects beyond the frame for engagement with the measuring rod or duplicating bar 22. Switches 62 and 63 are mounted on the vertical end wall 82 of the frame 80 and a pair of levers 88 and 89 are mounted on the frame and pivotally connected to multiply the motion of the push-rod 86 to actuate the switches 62 and 63.

Lever 88 is pivotally mounted adjacent one end by a pivot pin 90 extending between side walls 84 and 85 so that a short arm 91 projects into the path of the end of the push-rod 86 and the opposite long arm is bifurcated to provide an opening 93 therein. The lever 89 is positioned in the opening 93 between the bifurcations of the long arm 92 of the lever 88 and is pivoted thereto adjacent one end by a pivot pin 94 extending between the bifurcations. Thus, the lever 89 has a short arm 95 projecting beyond the long arm 92 of the lever 88 and a long arm 96 projecting upwardly into the opening 93 between the bifurcations.

An adjustable trip 97 is positioned on the arcuate wall 83 of the frame 80 for engagement by the short arm 95 of the lever 89 when the lever 88 is rocked clockwise on its pivot 90 as viewed in Figure 11.

The lower end of the long arm 92 of the lever 88 has an inclined face 100 and the upper end of the long arm 96 of the lever 89 has an inclined face 101. Adjustable stop members 102 and 103 on the upright end wall 82 of the frame 80 are engaged by the levers 88 and 89 to limit their rearward movement. Switches 62 and 63, in turn, are adjustable vertically with respect to the inclined faces 100 and 101 on the levers 88 and 89, respectively, by means of adjusting screws 104 and 105. By releasing the fastening means 106 and 107 for switch 62 the latter may be moved vertically with respect to the cam face 100 until the pole 65 of the switch snaps into engagement with the contact 66, see Figure 9, after which the fastening means 106 and 107 are tightened. Switch 63 is adjusted with respect to the cam face 101 on the lever 89 by means of the adjusting screw 105 until pole 70 snaps into engagement with contact 71. The switches 62 and 63 are then in the position illustrated in Figure 9. When push-rod 86 rocks the lever 88 on pivot pin 90, see Figure 14, the cam face 100 immediately releases the switch 62 which then snaps to the position illustrated in Figure 10. During such movement, the lever 89 rocks on its pivot 94 and the stop 103 to maintain the switch 63 in the position illustrated in Figure 9. As soon as the lower short arm 95 of lever 89 engages the trip member 97, however, the lever 89 is rocked on its pivot 94 with a multiplied motion to release the switch 63, see Figure 15.

The cam operated switch 74 illustrated in Figure 9 is positioned adjacent the periphery of the abutment-cam 40, see Figure 2. Preferably, this switch 74 also is a micro-switch adapted to be operated by a lug or projection 110 on the periphery of the abutment-cam 40. The switch 74 has an actuating member 111 engaged by the projection 110 to open the switch when bearing rollers 36 are on the low points A of the cam faces 41 and 42, see Figure 6, and to release the switch for movement to closed position when the abutment-cam 40 is rotated to a slight angle from the low points. One form of the invention having now been explained in detail, the mode of operation is explained below.

For purposes of explanation, let it be assumed that the proper measuring or duplicating bar 22 is mounted on the table 3, the table is positioned at some location to the left of that illustrated in Figure 1 and the workpiece has been properly positioned on the table. Switch 57 of the push-button control box 11 is depressed to complete the circuit illustrated in Figure 9. Current then flows from the main 59 through conductor 64, pole 65 of switch 62, contact 66, coil 67 of relay switch 60 and then back through the conductor 68 to complete the circuit. Energization of the relay coil 67 closes relay switch 60 and energizes the motor 45.

Motor 45 drives through the pulley 46 and belt 47 to rotate the sheaves 29 and feed screw 27. If bearing rollers 36 are not contacting the faces 41 and 42 of the abutment-cam 40, the rotation of the feed screw 27 will cause the latter to move axially to the left as viewed in Figure 2 until the bearing rollers engage the cam faces. Continued rotation of the feed screw 27 then will cause the table 3 to advance with respect to the abutment 40. Such movement of the table 3 continues until the measuring bar or duplicating rod 22 engages and actuates the push-rod 86 of the controller 21. Engagement of the push-rod 86 with the short arm 91 of lever 88 rocks the long arm 92 thereof away from the switch 62, see Figures 9 and 11, which snaps the pole 65 in the position illustrated in Figure 9 to that illustrated in Figure 10. Movement of the pole 65 away from contact 66 de-energizes coil 67 and drops relay switch 60 to open position to de-energize the motor 45. Rotation of motor 45 and feed screw 27 then stops.

As soon as pole 65 of switch 62 moves from contact 66 into engagement with contact 69, coil 72 of relay switch 61 is energized, see Figure 10, to close the switch and energize the motor 48. Motor 48 operating through the worm 49, wheel 50, shaft 51, and bevel gears 52 and 53 rotates the abutment-cam 40 from the position illustrated in Figure 2 toward that illustrated in Figure 3. Such rotation of the abutment-cam 40 acting through the rollers 35 and 36 and sheave 29 bodily slides the feed screw 27 and table 3 at a slow rate to the precise position desired. Such a slow movement of the table 3 acts through the measuring rod or duplicating bar 22 and push-rod 86 of the control element, see Figure 11, which rocks the lever 88 from the position illustrated in Figure 13 to that illustrated in Figure 14. During such movement the lever 89 continues to hold the pole 70 of the switch 63 in engagement with the contact 71. As soon as the table 3 arrives at its precise position, the short arm 95 of the lever 89 engages the trip member 97 and is rocked with an accelerated and multiplied motion relative to the lever 88 away from the switch 63 as illustrated in Figure 15. Release of the switch 63 by the lever 89 immediately shifts pole 70 from engagement with contact 71 into engagement with contact 73 to de-energize the windings of motor 48 which rotate the abutment-cam 40 in one direction.

Simultaneously with the opening of switch contact 71, pole 70 of switch 63 moves into engagement with contact 73 to energize the windings of motor 48 to stop rotation in forward direction and start rotation in the reverse direction. Closing of pole 70 with contact 73 of switch 63 energizes the coil 75 of the reversing switch 76 through switch 74, which has been closed by rotation of abutment-cam 40, to immediately reverse the direction of rotation of the motor 48. Such reverse motion of the motor 48 operating through the driving mechanism rotates the abutment-cam 40 in the opposite direction and away from the bearing rollers 36 at the end of the feed screw 27. Thus, the feed screw 27 is uncoupled immediately upon the arrival of the table 3 to its adjusted position to relieve any stress between the screw and the table 3. Motor 48 will continue to rotate in a reverse direction until the abutment-cam 40 is returned to its initial position at which time the projection 110 thereon engages the actuating member 111 of the switch 74 to open the circuit and de-energize the motor.

In summation the traversing mechanism 2 of the present invention operates through the motor 45 to move the table 3 on the slide 4 against the reactive force of the abutment 40. When the table 3 approaches its adjusted position, the motor 45 is de-energized and the motor 48 energized to rotate the abutment-cam 40. Such rotation of the abutment-cam 40 bodily slides the feed screw 27 and table 3 to the precise position of adjustment, after which the rotation of the abutment-cam is reversed and moves out of engagement with the end of the feed screw 27 to permit the latter to expand relative to the element. The accurately positioned table 3 is then clamped to the slide 4 by the clamping means 17 to hold the workpiece accurately positioned relative to the tool for a machining operation.

Figure 16 illustrates a traversing mechanism 119 of modified construction for traversing the movable element of the machine in either direction. The traversing mechanism illustrated in Figure 16 is also adapted to be applied to standard machines as an auxiliary unit. Traversing mechanism 119 comprises a split casing having sections 120 and 121 for enclosing the end of a feedscrew 122 of a standard machine and the driving means 123 therefor. A shaft extension 124 is connected to the end of the feed screw 122 by a coupling 125 pinned thereto. Coupling 125 has annular flanges 126 and 127 forming abutments adjacent each end and a central bearing sleeve 128 therebetween on which a nut 129 is mounted to slide. Nut 129 has threads 130 on its periphery and is prevented from rotation by a projection 131 extending into a slot 132 in the casing section 121. Surrounding the nut 129 is a wheel 133 having threads in meshing engagement with the threads 130 on the nut 129 and gear teeth 134 on its outer periphery. As shown in Figure 17 a motor 135 drives a worm 136 which meshes with the gear teeth 134 on the wheel 133. Wheel 133 is positioned between abutment pads 137 and 138 on the casing sections 120 and 121 which hold the gear from movement laterally.

The traversing mechanism 119 illustrated in Figures 16 and 17 operates in substantially the same way as explained above with respect to the embodiment illustrated in Figures 1 to 15. Feed screw 122 is rotated by pinion 123 to advance the table 3. During such advancement of the table 3, the annular flange 126 of coupling 125 engages the end of the nut 129. This abuting engagement of the annular flange 126 with the end of the nut 129 together with the engagement of the side of the gear 133 with a pad 138 coinstitutes an abutment providing a reactive force against which the feed screw 122 operates to move the table 3. The feed screw 122 continues to rotate until the table 3 has been moved to its approximate position at which time rotation of driving pinion 123 is stopped and motor 135 is energized to drive through the worm 136 and wheel 133. Such rotation of the gear wheel 133 relative to the nut 129 causes the latter to slide to the right as viewed in Figure 16 and through the flange 126 to slide the shaft 122 and table to its accurate precise position. Immediately, the direction of rotation of the motor 135 is reversed to back the nut 129 away from the annular flange 126 to relieve any stress between the shaft and table 3.

When the table 3 is to be traversed in the opposite direction, the direction of rotation of the driving pinion is reversed which first causes the feed screw 122 to advance until flange 127 of coupling 125 engages the left hand side of nut 129. Nut 129 then acts as an abutment for the feed screw which advances the table 3 in the opposite direction to a starting position or to an adjusted position if desired. When the table is to be moved to an adjusted position, it is coarse fed to its approximate position by feed screw 122 and fine fed to its precise position by rotating wheel 133 in a reverse direction to slide the nut 129, feed screw 122 and table 3 to the left as viewed in Figure 16. Feed screw 122 will be uncoupled in the same way as previously explained by again reversing the direction of rotation of the wheel 133.

While two embodiments of the invention are herein illustrated and described, it will be understood that further modifications may be made in the construction and arrangement of elements without departing from the spirit or scope of the invention. Therefore without limitation in this respect, the invention is defined in the following claims.

I claim:

1. In a machine tool having a frame and separate elements for mounting a tool and workpiece, respectively, traversing mechanism acting between the frame and one of said elements for moving said element relative to the other element to accurately position the tool with respect to the workpiece comprising an abutment for producing a reactive force, a force applying member engaging said abutment in end to end relationship driving mechanism for relatively moving the abutment and force-applying member to move the movable element to a predetermined position, and said driving mechanism including means to move said abutment from physical engagement with the force applying means to relieve the stress therein and thereby prevent the element from creeping.

2. In a machine tool having separate elements for mounting a tool and workpiece, respectively, an abutment, a feed screw having one end engaging the abutment and screw threads thereon engaging one of the elements, means for turning the feed screw to advance the movable element relative to the abutment to a predetermined position, and means for moving the abutment away from and out of physical engagement with the end of the feed screw to permit the latter to expand relative to the element when the driving force is discontinued.

3. In a machine tool having separate elements for mounting a tool and workpiece, respectively, an abutment having a cam thereon, an actuating member projecting from one of the elements and engaging the cam on the abutment in end to end relationship, and means for moving the cam on said abutment in one direction to bodily push said member and elements to accurately position said tool and workpiece and then in the opposite direction to disengage said abutment from the member to prevent any creep from occurring in the element.

4. In a machine tool having separate elements for mounting a tool and workpiece, respectively, an abutment having a cam thereon, a feed screw having one end engaging the cam on the abutment and screw threads in screw threaded engagement with one of the elements, driving mechanism for turning the feed screw to advance the element relative to the abutment to its approximate position, and driving mechanism for moving the cam on the abutment in one direction to bodily slide the feed screw and movable element to a precise position to accurately position the tool and workpiece.

5. In a machine tool having separate elements for mounting a tool and workpiece, respectively, a feed screw having screw-threads in screw threaded engagement with one of the elements, an abutment engaged by the end of the feed screw, driving mechanism for rotating said feed screw to advance the element relative to the abutment, means for moving the abutment away from and out of physical contact with the end of the feed screw, and said abutment and means for removing the abutment being mounted on the machine as a unit attachment.

6. In a machine tool having separate elements for mounting a tool and workpiece, respectively, a feed screw having a screw threaded engagement with the element to be moved, a rotatable cam engaged by one end of the feed screw, means for rotating the feed screw to advance the element relative to the abutment to its approximate position, a reversible electric motor for rotating the cam in one direction to bodily slide the feed screw and element to its precise position to accurately position the work piece with respect to the tool and in the opposite direction to rotate the cam away from and out of physical contact with the end of the feed screw, and said cam and driving motor being mounted for attachment to the machine as a unit.

7. A machine tool in accordance with claim 1 including a control means responsive to the position of the movable element and connected to initiate operation of said means of said driving mechanism to move said abutment.

8. A machine tool in accordance with claim 1 in which the means to relatively move said abutment and force applying member is an electric motor and an electric switch for controlling the motor, and means responsive to the position of the movable element for actuating the switch.

9. A machine tool in accordance with claim 8 in which the electric motor is reversible, the switch is a two position switch, an electric circuit including the switch and motor, said switch in one position energizing the motor to move the abutment in one direction to slide the element to accurately position the workpiece with respect to the tool, and said switch in its other position energizing the motor for reverse rotation to move the abutment away from the force applying means.

10. A machine tool in accordance with claim 7 in which the control means comprises a switch and pivotally connected compound levers for multiplying the movement of the element to actuate the switch.

11. A machine tool in accordance with claim 10 in which the means responsive to the position of the movable element for actuating the switch comprises a lever pivotally mounted adjacent one end, a second lever pivotally connected to the first lever adjacent its opposite end and engaging the control switch, and a fixed trip engageable by the end of the second lever adjacent its pivot to move it away from the switch with a multiplied motion of the first lever.

12. A controller comprising a frame, a switch mounted on the frame, a lever pivotally mounted on the frame adjacent one end, a second lever pivotally mounted on the first lever adjacent its opposite end, said second lever engaging said switch at a point remote from its pivotal connection with the first lever, and an abutment engaged by the short end of the second lever to move said second lever away from said switch with an accelerated and multiplied motion of said first lever.

13. A control element comprising a frame, a lever pivotally mounted on the frame adjacent one end, said lever having a short arm at one side and long bifurcated arms at the opposite side of its pivotal mounting, a second lever located between the bifurcated arms of the first lever and pivotally mounted thereon adjacent their outer ends, said second lever having a short arm projecting from one side of the pivot and a long arm projecting from the opposite side of its pivot, a switch for each lever mounted on the frame adjacent the end of its long arm, respectively, and a trip element on the frame adjacent the short arm of the second lever whereby rocking movement of the first lever on its pivot moves its long arm away from its switch and the engagement of the short arm of the second lever with the trip element rocks the long arm of the second lever away from its switch with a multiplied accelerated motion.

14. A control element in accordance with claim 13 in which the ends of the long arms of the levers have inclined faces, adjustable stops on the frame to accurately position the levers, and means for adjusting the switches on the frame relative to the inclined faces on the levers.

15. In a machine tool having a frame and separate elements on the frame for mounting a tool and workpiece, respectively, a traversing mechanism acting between the frame and one of the elements for moving said element relative to the other element to accurately position the tool with respect to the workpiece comprising an abutment and an adjacent force applying member mounted for relative movement toward and away from each other, and driving mechanism for relatively moving the abutment and force-applying member toward each other into abutting engagement to cause the movable element to be moved to a desired location and then away from and out of physical contact with each other to disconnect the abutment and force-applying member acting between the frame and movable element to relieve stress and thereby prevent the movable element from creeping.

16. In a machine tool having a frame and separate elements on the frame for mounting a tool and workpiece, respectively, a traversing mechanism acting between the frame and one of the elements for moving said element relative to the other element to accurately position the tool with respect to the workpiece comprising an abutment having a contacting face movable relative to the movable element, and driving mechanism for moving the contacting face of the abutment in one direction to engage and bodily push the movable element to the desired position and then in the opposite direction to physically disconnect the abutment and movable element to relieve the stress in the traversing mechanism acting between the frame and element and thereby prevent the element from creeping.

17. A machine tool in accordance with claim 1 in which the force-applying member is a feed screw having screw threads in screw threaded engagement with the movable element, the abutment is a member having one end engaging the end of the feed screw, a reaction member on the frame surrounding the abutment member, said abutment and reaction members having interengaging screw threads, and a reversible driving mechanism for relatively rotating the abutment and reaction members to move the abutment member axially and bodily slide the feed screw and element to a predetermined position and then move the abutment axially in the opposite direction and out of physical engagement with the end of the feed screw.

References Cited in the file of this patent

UNITED STATES PATENTS

| | | |
|---|---|---|
| 2,340,087 | Stapleton | Jan. 25, 1944 |
| 2,636,398 | Lens | Apr. 28, 1953 |
| 2,694,961 | Senn et al. | Nov. 23, 1954 |
| 2,696,145 | Horlacher | Dec. 7, 1954 |
| 2,722,853 | Knosp et al. | Nov. 8, 1955 |